United States Patent
Rothschild

(10) Patent No.: US 12,406,571 B2
(45) Date of Patent: Sep. 2, 2025

(54) METHODS AND SYSTEMS FOR DETECTING BAD DRIVING IN OTHER VEHICLES AND REPORTING ABOUT THE SAME

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

(21) Appl. No.: 18/406,639

(22) Filed: Jan. 8, 2024

(65) Prior Publication Data

US 2025/0225863 A1 Jul. 10, 2025

(51) Int. Cl.
*G08B 31/00* (2006.01)
*G06V 20/58* (2022.01)
*G07C 5/00* (2006.01)

(52) U.S. Cl.
CPC ............. *G08B 31/00* (2013.01); *G06V 20/58* (2022.01); *G07C 5/008* (2013.01)

(58) Field of Classification Search
CPC ......... G08B 31/00; G06V 20/58; G07C 5/008
See application file for complete search history.

(56) References Cited

U.S. PATENT DOCUMENTS

| | | | |
|---|---|---|---|
| 10,599,155 B1* | 3/2020 | Konrardy | G06N 3/088 |
| 2011/0320492 A1* | 12/2011 | Inghelbrecht | G06Q 50/40 |
| | | | 707/E17.014 |
| 2017/0132917 A1 | 5/2017 | Ricci | |
| 2018/0174446 A1* | 6/2018 | Wang | G08G 1/096716 |
| 2020/0250541 A1* | 8/2020 | Kim | G06N 3/045 |
| 2021/0049908 A1* | 2/2021 | Pipe | G08G 1/0112 |

* cited by examiner

*Primary Examiner* — Daryl C Pope
(74) *Attorney, Agent, or Firm* — Dobbin IP Law, P.C.; Geoffrey E. Dobbin

(57) ABSTRACT

According to aspects illustrated herein, methods and systems for detecting bad driving in other vehicles and reporting about the same are disclosed. The method includes equipping a vehicle with a plurality of capturing devices for capturing visual and non-visual data of other vehicles. The captured visual and non-visual data is analyzed to detect signs of bad driving by the other vehicles based on one or more pre-defined rules. Specifically, the captured visual and non-visual data is analyzed is detect one or more offending vehicles of the other vehicles based on the one or more pre-defined rules. Based on the detection, the signs of bad driving by the other vehicles (specifically, the offending vehicles) are communicated to at least: one or more surrounding vehicles, and/or to law & order enforcement authorities for a required action.

20 Claims, 6 Drawing Sheets

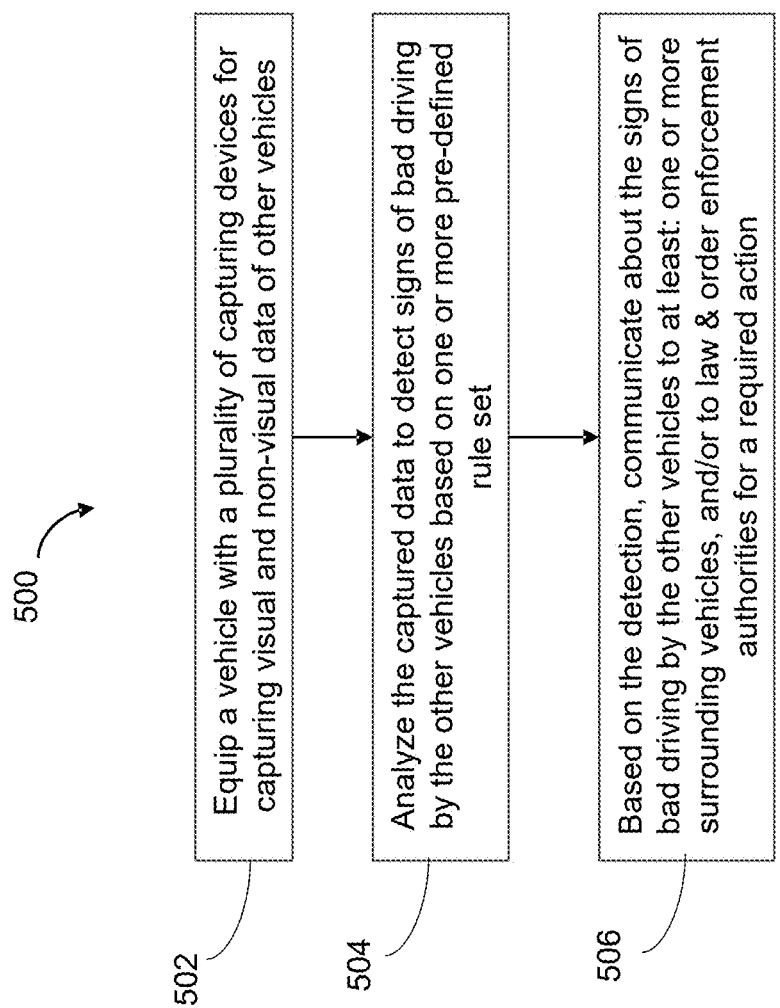

METHODS AND SYSTEMS FOR DETECTING BAD DRIVING IN OTHER VEHICLES AND REPORTING ABOUT THE SAME

TECHNICAL FIELD

The present disclosure relates to the field of vehicles, more specifically, the disclosure discloses methods and systems for detecting bad driving in other vehicles and reporting about the same to multiple parties in real-time.

BACKGROUND

In recent years, the increase in the number of vehicles on the road has resulted in a growing concern regarding road safety. Bad driving behavior such as aggressive driving, tailgating, reckless lane changes, excessive speeding, distracted driving, etc. poses a significant threat to the safety of all road users. As populations grow and the use of mobile devices becomes ubiquitous, there is a rising concern regarding dangerous/bad driving behaviors on roadways. Despite numerous efforts to promote responsible driving and enforce traffic laws, bad driving behavior remains a pervasive issue. For example, conventional enforcement methods, such as law enforcement personnel and static traffic cameras, have limitations in their ability to promptly detect and mitigate bad driving behavior in real-time. Also, the traditional methods of monitoring and enforcing traffic laws have limitations in terms of accuracy, coverage, and real-time reporting. The traditional methods of monitoring and reporting such activities are often limited in their scope and efficiency.

Taking an example of the traditional methods-they focus on warning a driver of a vehicle based on mere fixed features like speeding, honking a couple of times, and so on. In such methods, the vehicle driver/operator mostly ignores such warnings/alerts by its own vehicle and not necessarily requires taking any action. This may later lead to compromising his own safety and safety of other vehicles on roads. In another example, it is seen that most of the times, local authorities are not at the scene of the offense, and thus the vehicle showing bad driving/bad driver can easily get away with this dangerous illegal activity. In this view, there is a need for improvised/advanced methods and systems that can focus on detecting bad driving in other vehicles as well as reporting in real-time for a timely action.

SUMMARY

According to aspects illustrated herein, methods and systems for detecting bad driving in other vehicles and reporting about the same are disclosed. The method includes equipping a vehicle with a plurality of capturing devices for capturing visual and non-visual data of other vehicles. The captured visual and non-visual data is analyzed to detect signs of bad driving by the other vehicles based on one or more pre-defined rules. Specifically, the captured visual and non-visual data is analyzed is detect one or more offending vehicles of the other vehicles based on the one or more pre-defined rules. Based on the detection, the signs of bad driving by the other vehicles (the offending vehicles) are communicated to at least: one or more surrounding vehicles, and/or to law & order enforcement authorities for a required action.

According to additional aspects, the disclosure discloses a system for detecting and reporting bad driving on roads. The system includes a reporting vehicle including a plurality of capturing devices to capture live visual and non-visual data about other vehicles, and a communication module for transmitting the captured data to one or more remote servers for analysis, processing and/or use. The system further includes the one or more remote servers communicatively coupled to the reporting vehicle. The one or more remote servers are configured for receiving the captured data and processing the captured data in real-time to detect signs of bad driving by the other vehicles; and communicating about the detected bad driving by the other vehicles to at least: one or more surrounding vehicles on the roads within a predetermined proximity of the vehicle, and/or to law & order enforcement authorities for a required action. The system includes one or more remote databases for storing the captured visual and non-visual data about the other vehicles later retrieval and/or use.

According to further aspects illustrated herein, a bad driving detection and reporting system on a vehicle for detecting bad driving in other vehicles on roads is disclosed. The bad driving detection and reporting system includes a plurality of capturing devices for continuously capturing visual and non-visual data associated with the other vehicles in real-time; a controller for analyzing the captured visual and non-visual data to classify and detect bad driving by the other vehicles based on one or more pre-defined rules; and a communication module for communicating about the detected bad driving by the other vehicles to at least: one or more surrounding vehicles on the roads within a predetermined proximity, and/or to law & order enforcement authorities for a required action.

According to additional aspects, the present disclosure discloses a bad driving servicing database. The database includes visual and non-visual data captured by one or more capturing devices about vehicles on roads, including driving activities by the vehicles, characteristics associated with the vehicles, images of the vehicles, images of the respective drivers of the vehicles, location of the vehicles when a sign of bad driving is seen/noticed/recorded; incidences categorized as signs of bad driving; and specific information about the vehicles showing signs of bad driving behavior.

The objective of the disclosure is to provide systems and methods for detecting bad driving in other vehicles in real-time and reporting about the bad driving behavior of those vehicles to surrounding vehicles as well as to law & enforcement authorities. The present disclosure provides methods and systems that detect bad driving and warn surrounding vehicles such that the surrounding vehicles can take timely action, thereby significantly reducing the risk to public safety.

The demand for advanced solutions that can accurately capture, classify, and report dangerous driving incidents of the surrounding vehicles in real-time is required. In other words, the methods and systems need to focus on an action-oriented approach for other surrounding vehicles, law & enforcement authorities, and others.

The methods and systems incorporate a comprehensive approach that employs a network of capturing devices, cloud-based servers, artificial intelligence, and machine learning algorithms to capture, identify, classify, report and store bad driving data, which are signs of bad driving/dangerous driving behaviors in real-time.

The disclosure promotes road safety awareness as well as provides safe road environment.

The disclosure intends to detect bad driving in other vehicles unlike existing solutions, where so called bad driving is detected in their own vehicle. The existing solutions warn drivers of lane changes, speeding, and other problem areas but those solutions do not warn other vehicles but just the vehicle operator/driver. Hence, the proposed solution focuses on detecting and warning bad driving in other vehicles and the bad driving is far more real, contextual, and complex in nature as discussed below than mere lane changes, over speeding, etc. Once bad driving is detected, reporting about the bad driving is made to several parties. For example, reporting is made to other vehicles in proximity so that they can take timely action. In another example, reporting is made to law enforcement authorities. In further example, reporting is made to law enforcement authorities in proximity. In additional examples, bad driving information is sent to national and local databases. The bad driving information is sent to local storage for later retrieval in the user's own vehicle storage system, for example, the storage can include audio, still images, video, and other pertinent data such as distance, speed, momentum, location, local traffic laws, etc.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute part of this specification, illustrate embodiments of the disclosure and together with the description explain the principles of the present disclosure. The embodiments illustrated herein are presently preferred, it being understood, however, that the disclosure

FIG. 5 is a method flowchart for detecting bad driving in other vehicles and reporting surrounding vehicles and/or to law& order enforcement authorities.

Like reference numerals refer to like parts throughout the several views of the drawings.

DESCRIPTION

Non-Limiting Definitions

Figure 1A:
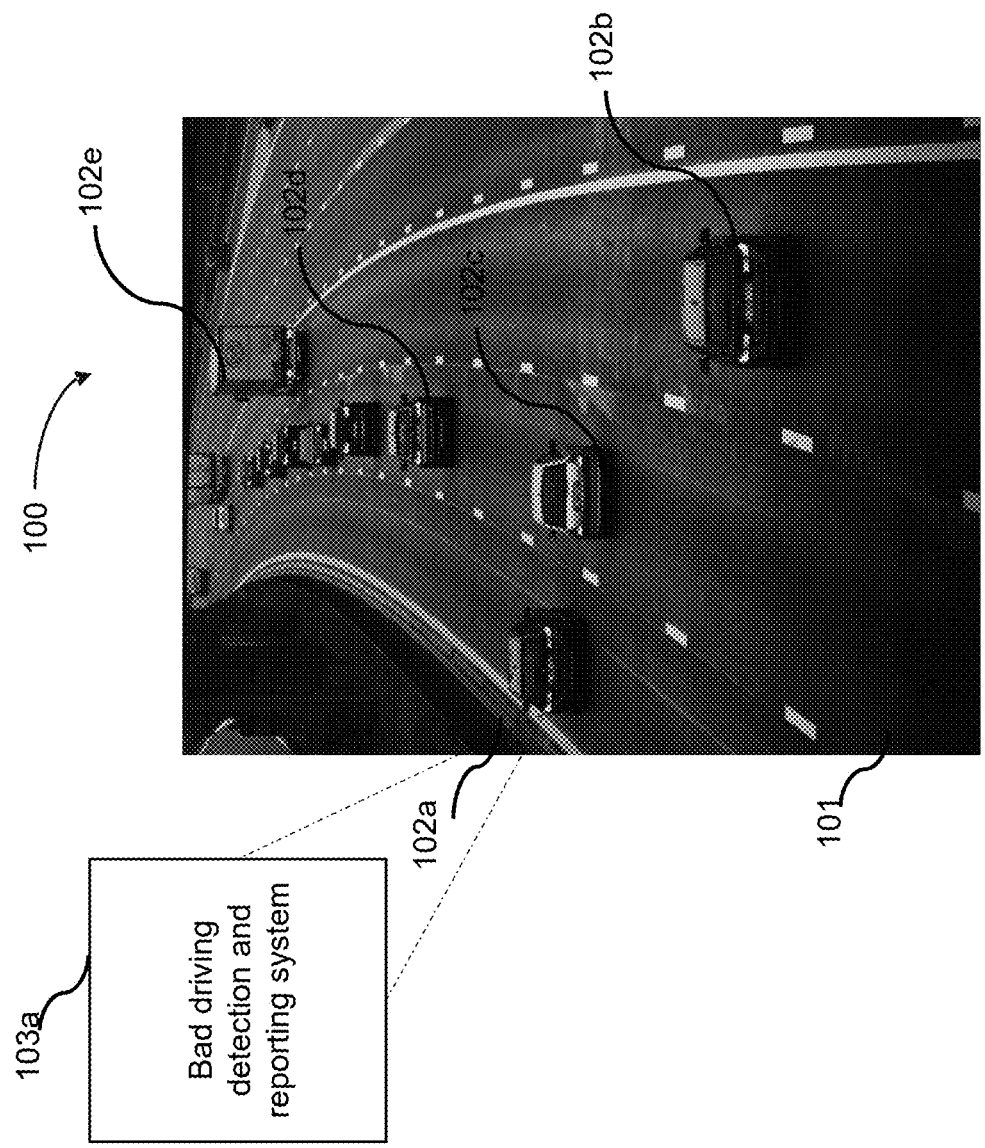
FIGS. 1A and 1B show exemplary environments in which various embodiments of the disclosure can be practiced.

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "vehicle" refers to any vehicle which a person uses for commuting from point A to point B. The vehicle can be a commercial vehicle such as a bus, truck, or a personal vehicle such as a car without limiting the scope of disclosure. In context of the current disclosure, the vehicle incorporates a novel system referred to as, a bad driving detection and reporting system for detecting bad driving in other vehicles and reporting about the same to multiple parties such as surrounding vehicles and/or law & enforcement authorities. The vehicle incorporating bad driving detection and reporting system for detecting bad driving in other vehicles may be called as a reporting vehicle.

The term "other vehicles" refer to vehicles showing bad driving or signs of bad driving and the other vehicles may be called as offending vehicles.

The term "surrounding vehicles" can be any vehicles in the surrounding of the vehicle and/or the other vehicles showing signs of bad driving. The surrounding vehicles can be vehicles ahead of the vehicle and/or the other vehicles, behind the vehicle and/or the other vehicles and/or within a predetermined range or a few kilometres range of the vehicle and/or the other vehicles. The surrounding vehicles may be called as nearby vehicles.

The term "bad driving detection and reporting system" monitors various driving behaviours/activities shown by vehicles on roads while driving and detects signs of bad driving behavior and further warns the surrounding vehicles. The bad driving detection and reporting system further reports about the bad driving by the other vehicles to law & order enforcement authorities. The system can include one or more modules for implementing the current disclosure that will be discussed in detail below. The bad driving detection and reporting system can be incorporated in any vehicle, but the architecture is such that it detects bad driving in other vehicles and further reports to the surrounding vehicles and/or law& enforcement authorities.

The term "signs of bad driving" or "bad driving" includes any driving activities, driving behaviour or a combination of driving activities that could be dangerous in nature, harmful to the society and/or violating laws. Few non-limiting examples of the bad driving behavior or signs of bad driving may include but are not limited to aggressive driving, exhibiting road rage, tailgating, reckless lane changes, excessive speeding, distracted driving, impaired driving, unlawful activity, or the like.

The term "pre-defined rules" refer to rules that are already defined by an administrator, local government, state government, or any authorized agency to detect bad driving. The pre-defined rules can be updated as and when required.

The term "characteristics" refers to include various characteristics associated with a vehicle that can help identify the vehicle such as but not limited to color, model, vehicle type, vehicle features, license plate number, vin number, manufacturer of the vehicle, or the like.

The term "required action" can include any action that can be taken by the surrounding vehicles to protect themselves from the bad driving and/or offending vehicles on roads. For example, the required action by a surrounding vehicle may be changing its route. The term "required action" can include any action that can be taken by the law & enforcement authorities such as but not limited to sending warning messages to the other vehicles.

Overview

To address a pressing need for enhanced road safety measures in the context of a growing population and technological advancements, the present disclosure is proposed. The disclosure proposes a new bad driving detection and reporting system that is a technologically advanced system and can accurately capture, classify, detect, and report bad driving incidents in real-time.

The disclosed systems and methods provide a comprehensive solution for monitoring and reporting bad driving including dangerous driving activities. The methods and systems leverage advanced technologies such as AI, machine learning, a network of capturing devices and a multi-tier approach for processing and storing data, thereby providing a robust system to enhance road safety. The described system and methods would not be able to be accomplished with just human intelligence. The methods and systems focus on action-oriented approach, for example, the methods and systems hold reckless drivers accountable for their bad driving. In another example, the methods and systems warn other surrounding vehicles in advance such that they can take timely action.

The present disclosure focuses on detecting bad driving in other vehicles and further warning surrounding vehicles about their bad driving which is far more contextual and complex in nature than just mere individual features like speed warning, lane changes warning, or the like. The present disclosure considers real situations and scenarios to detect bad driving such as if a vehicle is following too close, if a vehicle is cutting other vehicles on roads, if a vehicle is driving at excessive speeds, if a vehicle is running stop signs, if a vehicle is weaving in and out of traffic lanes, if a vehicle is involved in road raging activities or the like. The disclosure detects as well as warns about others bad driving behavior that could be dangerous to surrounding vehicles, environment and/or public safety.

The objective of the disclosure is to detect bad driving in/by other vehicles and send warning messages to other surrounding vehicles (i.e., other road users who are NOT showing signs of bad driving). The disclosure further communicates about bad driving to law & enforcement authorities. The disclosure further associates bad driving with a driver instead of bad driving by a vehicle.

The methods and systems incorporate one or more sensors to capture both visual and non-visual data related to driving and/or associated vehicles on roads. Some examples of the sensors are such as resolution imaging devices, infrared imaging devices, LiDAR, sonar, radar devices, and audio capturing devices. The captured data is then transmitted in real-time using a variety of communication devices, such as GPS systems, satellite systems, Wi-Fi, cellular, and other networks, to one or more servers.

For example, a first server processes the captured data using tools such as artificial intelligence and machine learning algorithms (collectively, "AI systems") to identify/detect bad driving behaviors or signs of bad driving with a high degree of accuracy. Then, the first server stores relevant information about the detected incidents that can be categorized and classified under bad driving. The first server may include a storage module for storing information associated with bad driving. The first server may further provide the bad driving data in the form of warnings or alerts to surrounding vehicles within the range of the reporting and/or the offending vehicle.

In a further example, another server may be incorporated to store detected incident data associated with bad driving and may further provide on-demand access to this information. The data can be provided to interested parties or vehicles or any user needing the required data. The data can be provided based on one or more models such as on demand models, subscription-based models, etc.

In additional examples, another server may be incorporated that can be accessed by law & order enforcement authorities such as local authorities, state authorities and national authorities. The third server can act as a central hub for law & enforcement authorities to retrieve incident data and take appropriate action. The third server additionally incorporates features of sending warning and citations to the offending vehicles and/or drivers of the offending vehicles. In such implementation, a warning and notification system is integrated into the third server that allows sending of warnings or citations to the offending drivers/vehicles.

The present disclosure provides methods and systems for detecting bad driving in other vehicles and communicates about the bad driving behaviour to surrounding vehicles and/or law & enforcement authorities. The methods and systems focus on action-oriented approach such that the surrounding vehicles and/or law authorities can take the needed action. The system includes hardware and/or software components required for implementing the disclosure. For example, the system includes one or more hardware components such as various sensors, memory, and software components such as a controller, user interface etc. The hardware and software components work in tandem with each other such that bad driving on roads can be detected and further controlled to provide overall safe and friendly environments to road users. The action-oriented approach/solution proposed by the disclosure, where action taken by the surrounding vehicles for its own safety or by authorities for review and penalties is tangible in nature and hence the solution proposed in the disclosure provides tangible output and is not an abstract idea.

Detecting bad driving in other vehicles and communicating to surrounding vehicles and law& enforcement authorities in real-time are a technical solution to long standing problem, where warning messages are sent only to person/vehicle involved in dangerous driving activities is not an abstract idea because of many reasons. Detecting bad driving behavior in other vehicles and communicating to surrounding vehicles and law& enforcement authorities in real-time is not an abstract idea because it is not merely an idea itself (e.g., it cannot be performed mentally or using pen and paper). Detecting bad driving in other vehicles and communicating to surrounding vehicles and law& enforcement authorities in real-time is not an abstract idea because it is not a fundamental economic practice (e.g., is not merely creating a contractual relationship, hedging, mitigating a settlement risk, etc.). Detecting bad driving in other vehicles and communicating to surrounding vehicles and law& enforcement authorities in real-time is not an abstract idea, it is not a method of organizing human activity (e.g., managing a game of bingo). Detecting bad driving in other vehicles and communicating to surrounding vehicles and law& enforcement authorities in real-time is not an abstract idea because the methods and systems are not simply a mathematical relationship/formula but instead include capturing real-time data using various sensors, analyzing real-time driving activities, sending warning messages for a required action, and providing access to various third parties.

Detecting bad driving in other vehicles and communicating to surrounding vehicles and law & enforcement authorities in real-time is not an abstract idea because it enhances road safety, prevents accidents, or reduces the number of accidents or unpredicted incidences, saves lives of users, and overall provides safe environment to road users.

Detecting bad driving in other vehicles and communicating to surrounding vehicles and law & enforcement authorities in real-time is not an abstract idea because the disclosure requires one or more hardware components such as vehicles, cameras, sensors, memory, and software components such as a controller, user interface etc. The hardware and software components work in tandem with each other to enhance road safety.

Detecting bad driving in other vehicles and communicating to surrounding vehicles and law & enforcement authorities in real-time are not an abstract idea because the disclosure allows for significant improvement to the technical fields of user experience on road, safety of road users, efficient processing, or the like.

The disclosure clearly differentiates over the prior art by incorporating one or more features such as detecting bad driving in other vehicles and sending warning messages to adjacent vehicles and communicating to law & enforcement authorities for a required action, specifically, authorities nearest to the scene of bad driving instead of detecting bad driving in their own vehicles and displaying alerts on dashboards.

The present disclosure proposes an architecture such that a system of a driver's vehicle (vehicle A), who is driving safely, detects bad driving in other vehicles such as vehicle B, vehicle C and other vehicles. The system of the vehicle A records the bad driving information and sends it to cloud server. The cloud server can then retransmit the bad driving information to other vehicles in vicinity of the vehicle A. The system further stores the bad driving information and reuses it as and when required. The system further transmits the bad driving information to the nearest law enforcement authority to the vehicle A. The system further transmits the bad driving information to other interested parties. The system further transmits the bad driving information to a permanent cloud repository of bad drivers. In another embodiment the system may also locally store the bad driving information in the vehicle.

Exemplary Environment

FIG. 1A illustrates an exemplary environment 100 in which various embodiments of the disclosure can be practiced. The environment 100 shows a road 101, where a plurality of vehicles such as 102a, 102b, 102c, 102d, 102e, (collectively 102) are running on the road 101. Each vehicle 102 may be same, or different from other vehicle. Each vehicle 102 may have same characteristics, distinctive characteristics, or a combination thereof. Each vehicle 102 may have at least one person, for example, a driver but may have more occupants such as passengers. Typically, each vehicle 102 may be used for various purposes, for example, the vehicle 102a may be used by a driver for going from home to office. In another example, the vehicle 102b may be used for going on a trip. In further example, the vehicle 102c may be used for doing day-to-day-household task. In another example, the vehicle 102d may be used for some other type of work. Each vehicle 102 has a driver (although not shown) who drives the vehicle 102 from point A to point B. Each driver may have different habits of driving cars or different driving patterns. For example, the driver of the vehicle 102a may follow rules and regulations and drives safely, while the driver of the vehicle 102b always exhibits unsafe driving and may pose threats to other people, surrounding vehicles such as 102a, 102c, 102d and 102e and/to the environment. In further example, the driver of the vehicle 102c may have an unpredicted pattern such as sometimes he drives safely but sometimes, he does rash driving which again could be dangerous to the society and/or to the environment. In context of the current disclosure, at least one vehicle such as a vehicle 102a includes a bad driving detection and reporting system 103a. But the implementation and architecture are such that the bad driving detection and reporting system 103a of the vehicle 102a detects bad driving in other vehicles. For example, the bad driving detection and reporting system 103a of the vehicle 102a detects bad driving in/of/by other vehicles such as 102b, 102c, and 102d. For easy understanding, it is considered that the vehicle 102a that detects and reports about the bad driving is the vehicle that drives safely on roads. In some implementations, some vehicles such as 102a, 102b may have bad driving detection and reporting system (although not shown) but some vehicles may not necessarily have bad driving detection and reporting system in their vehicles. For the sake of discussion, it is considered that the vehicle 102a drives safely on the road 101 and further incorporates the bad driving detection and reporting system 103a.

In execution, the bad driving detection and reporting system 103a captures visual data and non-visual data of other vehicles in real-time using one or more sensors. The data may be a live visual and non-visual data. The data may also be sound/audio data. The bad driving detection and reporting system 103a further analyses and processes the captured data to detect bad driving behavior or any signs of bad driving by other vehicles on the road 101 such as vehicles 102b, 102c, 102d, 102e. Upon detection of the bad driving behavior or signs of bad driving, the bad driving detection and reporting system 103a sends warning messages to surrounding vehicles for a required action. For example, if the bad driving detection and reporting system 103a detects bad driving behavior by the vehicle 102b, the bad driving detection and reporting system 103a sends warning messages to other surrounding vehicles such as vehicles 102c, 102d, and 102e. An exemplary warning message can be—"There is bad driving vehicle around you, please stay careful." Another exemplary message may be—"A bad driving vehicle may approach you shortly, please be careful or change your route." Further exemplary message may be—"A bad driving vehicle is nearby, please adjust the speed and maintain lane discipline respectively." The warning message can be in the form of text, audio message, video and/or can be displayed via a heads-up display unit of the vehicles 102c, 102d and 102e or a combination of thereof. The warning messages are sent such that drivers of these vehicles 102c, 102d and 102e do not get distracted by the messages. This way, the disclosure enhances safety of the vehicles 102 on the road 101 and prevents any accidents or losses of lives.

In detail, the bad driving detection and reporting system 103a incorporates various aspects such as real-time data gathering, identification and classification, storage, and notification and/or warning messages. In data gathering stage, the system 103a gathers data from various sources/sensors such as but not limited to high-resolution imaging, infrared imaging, LiDAR, sonar, radar, and audio recording devices.

In identification and classification stage, the system 103a analyses the captured data and processes the data to detect bad driving behavior or signs of bad driving using AI and machine learning algorithms such as speeding, lane veering, tailgating, and more. In storage aspect, the system 103a stores the captured data, and relevant data such as bad driving incident information in various formats and in one or more databases for later retrieval, access and/or use. The data is stored such that it can be accessed by various parties, law & enforcement authorities or any users who requests for the data. The data can be stored in a local or cloud-based server, accessible upon request. In notification and warning system, the system 103a informs about the bad driving information to nearby vehicles and/or interested parties. The information about bad driving is shared with nearest law enforcement vehicles to facilitate immediate intervention. The notification can be sent via text message, email, phone message, or through the driver information control display with warnings or citations as permitted by local and state laws. The warning messages/alerts that are sent to the surrounding vehicles may be created by machine learning/AI driven computational systems as known or later developed systems.

The bad driving detection and reporting system 103a can communicate with other bad driving detection and reporting systems in other vehicles. For example, the bad driving detection and reporting system of the vehicle 102a can communicate with the bad driving detection and reporting system installed in the vehicles 102b, 102c, 102d and 102e using known communication methods or later developed communication protocols. For instance, if the bad driving detection and reporting system 103a of the vehicle 102a detects bad driving by the vehicle 102b, then the bad driving detection and reporting system 103a of the vehicle 102a sends warning messages to the respective bad driving detection and reporting systems of surrounding vehicles such as 102c, 102d, and 102e. The bad driving detection and reporting systems of these vehicles 102c, 102d, and 102e further display warning messages to the driver of these vehicles via their heads-up display units or other ways. The notified vehicles may respond to these messages automatically by correcting and adjusting the notified vehicles speed, direction, and sending audible signals (activating the horn), flashing lights, and other evasive or corrective action directed to keeping the notified vehicle safe.

Figure 1B:
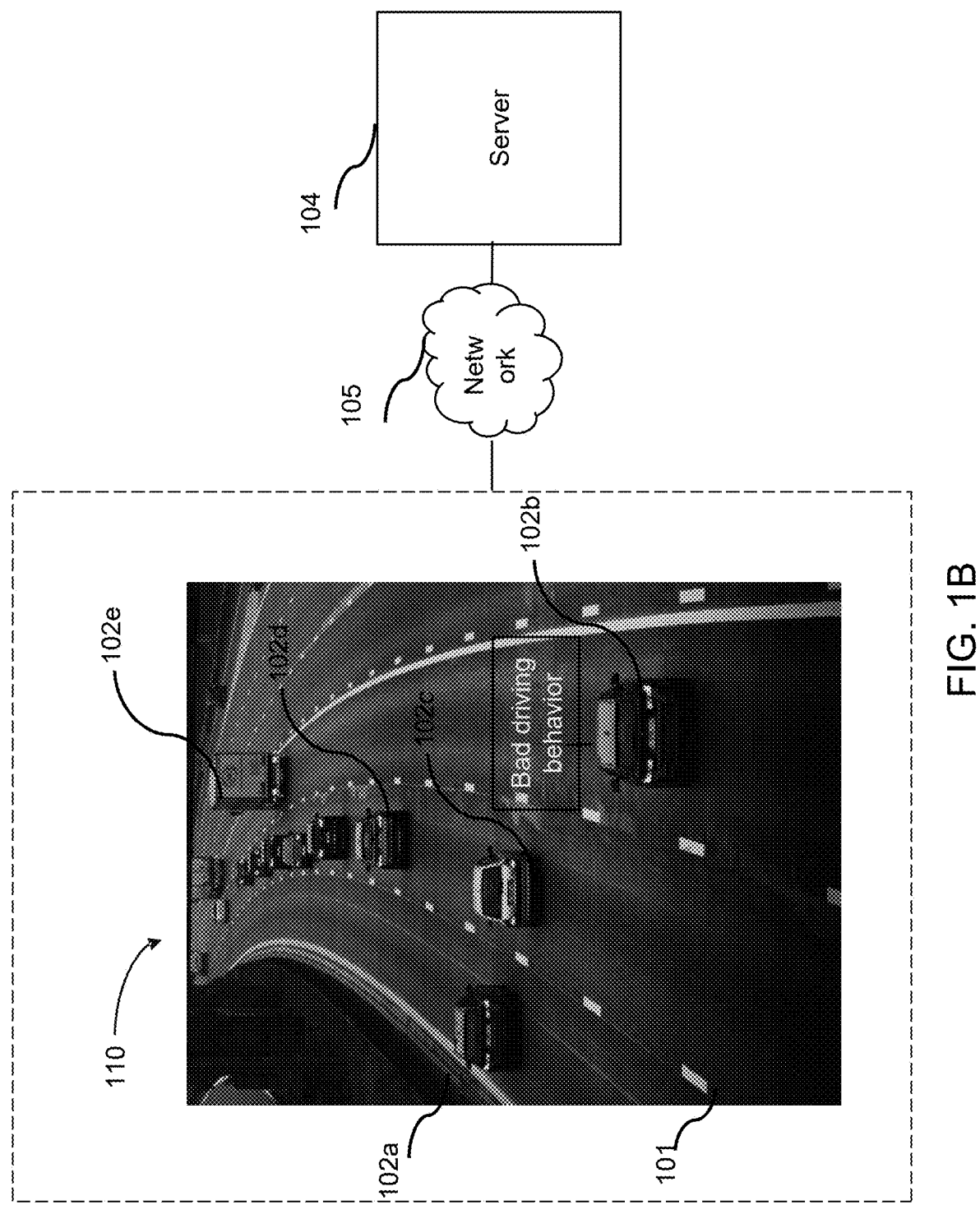

In the environment 100 of FIG. 1A, the bad driving detection and reporting system 103a of the vehicle 102a independently performs all tasks required for implementing the disclosure. For example, the bad driving detection and reporting system 103a captures the data and driving activities, analyzes, and processes the data and driving activities locally to detect the bad driving behavior in other vehicle/s (for e.g., 102b) and communicates to the surrounding vehicles such as 102c, 102d and so on. But the bad driving detection and reporting system 103a of the vehicle 102a can be communicatively coupled to one or more remote servers, remote databases via network as shown in FIG. 1B. In the environment 110 of FIG. 1B, the bad driving detection and reporting system 103a is communicatively coupled to the remote server 104 via a network 105. In such implementations, the bad driving detection and reporting system 103a captures live the driving activities & other data, sends the captured data to the remote server 104 for analysis and processing. The remote server 104 analyzes the captured data and detects bad driving or signs of bad driving by the other vehicles and communicates back to the bad driving detection and reporting system 103a, say to the vehicle 102a. Or the remote server 104 directly sends warning messages to the surrounding vehicles such as 102c, 102d about detected bad driving by the vehicle 102b. The remote server 104 further communicates about bad driving by the vehicle 102b to the law & enforcement authorities. The remote server 104 stores all information about bad driving in the remote database such as captured live visual and non-visual data about other vehicles, detected bad driving, information about the vehicles and so on for later retrieval, use and/or access.

The present disclosure offers peer-to-peer communication, peer-to-cloud communication, and cloud-to-peer communication. In peer-to-peer communication, two or more vehicles incorporating bad driving detection and reporting systems communicate with each other for various purposes such as sending warning messages, gathering data, or the like. In peer-to-cloud communication, one or more vehicles communicate with remote servers, database via network for various purposes such as transmitting the captured data, analyzing, and processing the captured data, storing the captured data, and other data relevant for implementing the disclosure. In cloud-to-peer communication, a remote server may communicate with vehicles for various purposes such as receiving the processed data, receiving the incident of bad driving, receiving information about bad driving, and other data relevant for implementing the disclosure.

Exemplary System

Figure 2:
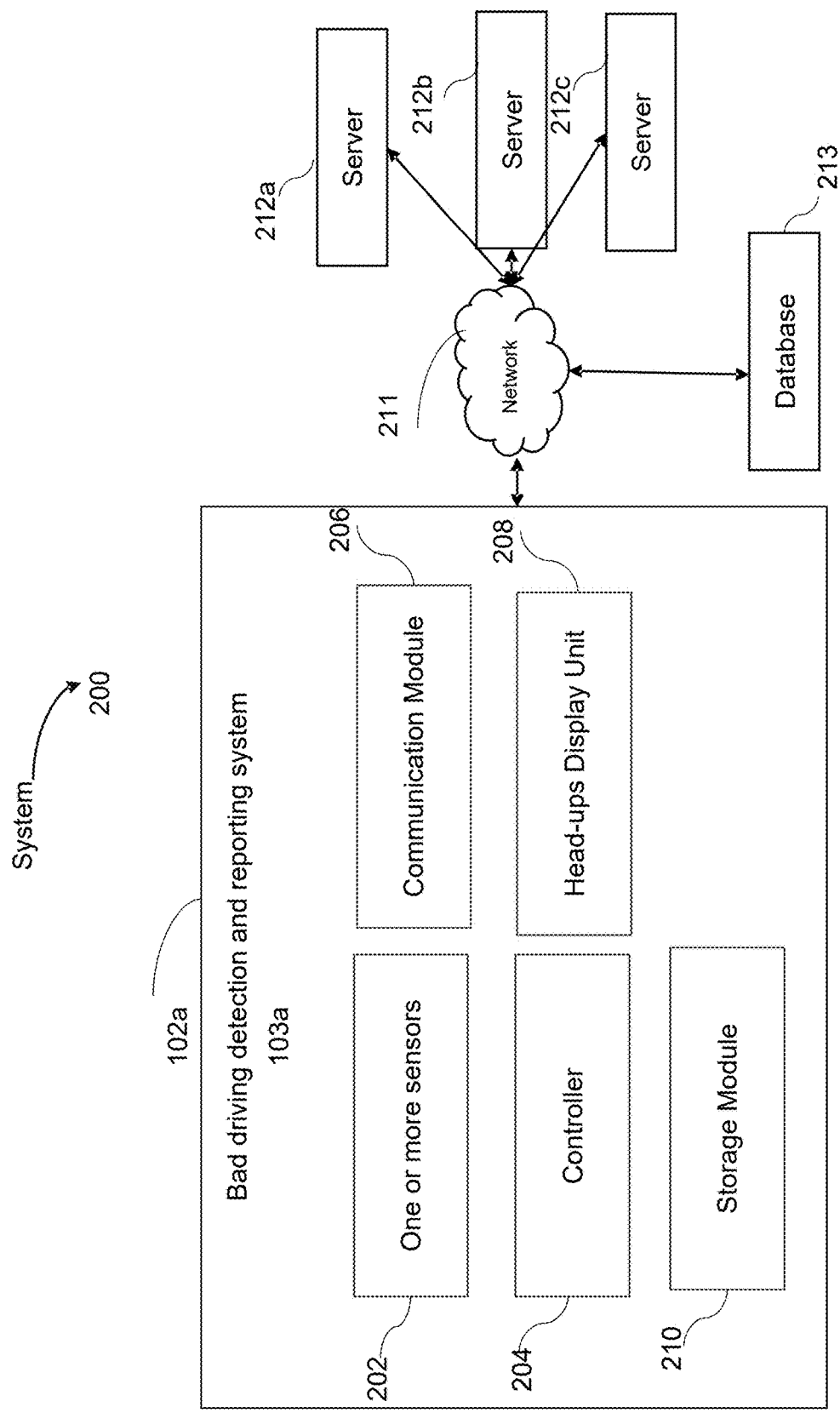
FIG. 2 shows a block diagram of an overall system for detecting bad driving in other vehicles and/or reporting to surrounding vehicles and/or to law& order enforcement authorities.

FIG. 2 discloses an overall system 200 for detecting bad driving on roads, the system includes a vehicle 102a. The vehicle 102a includes a bad driving detection and reporting system 103a that can be installed inside the vehicle 102a and/or on the vehicle 102a. The bad driving detection and reporting system 103a includes a plurality of capturing devices in the form of one or more sensors 202, a controller 204, a communication module 206, a heads-up display unit 208, and a storage module 210 such as memory. Some modules of the bad driving detection and reporting system 103a may be present/incorporated inside the vehicle 102a such as some sensors 202, the storage module 210, while some are incorporated on the outside of the vehicle 102a such as some sensors 202 with image capturing capabilities, the communication module 206 without deviating the scope of the disclosure. The components 202-210 are connected to each other via a conventional bus or a later developed protocol. Further, the components 202-210 communicate with each other for performing various functions of the present disclosure. The bad driving detection and reporting system 103a may further include additional component(s) as required to implement the present disclosure. As shown, the bad driving detection and reporting system 103a is communicatively coupled to one or more remote servers such as 212a, 212b, and 212c (collectively 212) via network 211. Similarly, the bad driving detection and reporting system 103a can be communicatively coupled to a remote database such as 213 via the network 211. The network 211 may be a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, satellite or any other appropriate network required for communication between the vehicle 102a (the bad driving detection and reporting system 103a) and the remote location such as the remote severs 212a, 212b, 212c and the remote database 213.

It is considered that the bad driving detection and reporting system 103a detects bad driving behavior in other vehicles, where the other vehicles may or may not have bad driving detection and reporting system.

The one or more sensors 202 are installed on the vehicle 102a for capturing visual and non-visual data of other vehicles including driving behaviour/activities required for detecting bad driving. Some non-limiting examples of the sensors 202 may include one or more high-resolution imaging devices such as cameras, one or more infrared imaging devices, one or more LiDAR devices, one or more sonar devices, one or more radar devices, one or more thermal sensing devices, or one or more audio devices. These are few examples of the sensors 202, other known sensors or later developed sensors may be used to capture the visual and non-visual data of other vehicles or associated with the other vehicles such as 102b, 102c, and others. The sensors 202 may also capture surrounding road activities.

For example, the high-resolution imaging device may capture image and/or videos of the vehicle such as sides, rear, and front of the vehicle, license plate, image of the driver. The infrared imaging devices may capture thermal images of desired portions of the interior compartments of the vehicle. The LiDAR devices may detect objects as well as capture distance of the vehicle from other objects such as people on road and/other surrounding vehicles using laser technology. For example, it may be used to measure distance between vehicles. The one or more sonar devices may detect an object using sound waves. The radar devices may determine the speed of the vehicle. The audio capturing devices may capture audio of the surroundings such as exterior sounds of the other vehicles. Additional examples of the capturing devices may include proximity sensors, thermal sensors, a global positioning system (e.g., GPS), information control unit and others. Additionally, the sensors 202 can detect surrounding road activity while driving.

As shown, the sensors 202 capture one or more driving activities being performed by the other vehicles on the road 101. The combination of one or more sensors 202 may capture or measure following: speed of the vehicle, time and date of the incident, acceleration of the vehicle, the direction of the vehicle, the speed variations of the vehicle, location variations (lane changes) of the vehicle, the location of the vehicle, the mapping of the roadway (lanes) that the vehicle is traveling on, recording of the surrounding vehicles (either through Intra-vehicle communication with the other vehicles, or alternatively image identification of the surrounding vehicles) and so on.

The live visual data and non-visual data of other vehicles may include still images, video, and other data such as distance, speed, momentum, location, audio, or the like. The sensors 202 continuously capture the live visual and non-visual data about the other vehicles in real-time. The sensors 202 send the captured the visual and non-visual data to the controller 204 for further analysis and processing. The controller 204 analyzes and processes the captured data to detect bad driving behavior or one or more signs of bad driving by the other vehicles. Specifically, the controller 204 identifies a vehicle from the other vehicles showing signs of bad driving on the road 101 and classifies that vehicle as an offending vehicle. The controller 204 may use AI and machine learning algorithms to detect the signs of bad driving. For example, the controller 204 identifies an activity of the one or more activities as a sign of the bad driving based on one or more pre-defined rules and algorithms. Few examples of the bad driving or signs of bad driving may include, but not limited to, speeding at substantial speeds above the legal speed limit, veering from lane to lane with or without any kind of signal indication, cutting drivers off with little or no room, tailgating other drivers, exhibiting road rage, running traffic stops and traffic lights, driving on illegal shoulders, driving down one way streets, driving down the wrong side of the street, making offense noises or signals (hand gestures or voice) at other drivers, ejecting articles from the vehicle.

Upon detecting the signs of bad driving, the controller 204 further identifies a location of an offending vehicle or a vehicle showing signs of the bad driving. The location of the offending vehicle is identified when the sign of bad driving behavior is detected. The location is identified from the captured data.

The controller 204 or the communication module 206 communicates about the bad driving behavior by the other vehicles to at least: one or more surrounding vehicles, and/or to law & order enforcement authorities for a required action.

The controller 204 sends warning messages about the bad driving to the surrounding vehicles, when the signs of bad driving by the offending vehicle is detected. In an implementation, the controller 204 communicates and sends warning about the bad driving to the surrounding vehicles via their heads-up display unit, where the information is displayed on the driver information control display in text or audio form. The warning messages are adapted to the situation and are created using machine language and AI processing. For example, if a vehicle is showing a sign of bad driving by over speeding, then a warning message is sent accordingly. In another example, if a vehicle is showing a sign of bad driving by road raging, then a warning message is sent and displayed accordingly.

The controller 204 or the communication module 206 further communicates about the detected bad driving to law & order enforcement authorities for a required action. In the case of law & order enforcement authorities, the controller 204 sends additional information such as details of the offending vehicle showing signs of bad driving, image of the driver, the location of the offending vehicle, the sign of bad driving, for further action. In some implementations, the controller 204 communicates about the detected bad driving to nearest law & order enforcement authorities for an immediate action or intervention. The controller 204 first identifies the nearest law & order enforcement authority by communicating with the remote server, say 212a. The controller 204 transmits the captured data including its location and offending vehicle location via a plurality of communication devices, such as GPS systems, satellite, Wi-Fi, cellular, and other networks, to the remote server 212. The remote server 212 stores real-time locations of all law & order enforcement authorities of an area, state, city, or a central authority. The remote server 212a correlates the location of the offending vehicle showing the sign of bad driving and matches its location with real-time the location of the law & order enforcement authorities. Based on the matching location, the remote server 212a identifies the nearest law & order enforcement authorities. The remote server 212a sends the location and details of the law & order enforcement authorities to the controller 204. The controller 204 sends a message about the bad driving to the nearest law & order enforcement authorities. The message can be sent but not limited to text, walkie talkie, phone, via a user interface of the law & order enforcement authority vehicle or can be displayed via its heads-up display unit. The nearest law & order enforcement authorities can take any prudent or required action, for example, follow the offending vehicle, detain the offending vehicle, send warning or citation messages to the offending vehicle, ask them to pay fine, cancel the license of the driver, decide the punishment, etc. The nearest law & order enforcement authorities further can send warning or citation messages to the offending vehicle via a variety of messaging services, including text messages, emails, phone messages, or a heads-up unit. The warning or citation messages may include fines or penalties for breaking the law in accordance with local and state regulations.

The controller 204 can employ artificial intelligence and machine learning techniques to measure various parameters related to the offending vehicle's behaviour, including speed, time, date, acceleration, direction, speed variations, location, and mapping of the roadway. The controller 204 may be equipped with onboard computer processing hardware for capturing and processing data, enhancing its capabilities for data collection and analysis. In other implementations, the controller 204 can send the captured data to one or more remote servers such as 212a, 212b and 212c for faster analysis processing and/or storage.

The storage module 210 such as memory stores information associated with the bad driving such as one or more activities, instances where bad driving is noticed, vehicle information, driver information, road & maps information, pre-defined rules, algorithms and so on. The controller 204 can retrieve the required information from the storage module 210 as and when required. The heads-up unit 208 displays any warning messages or alerts to the driver of the vehicle.

Although FIG. 2 is shown to include multiple remote servers such as 212a, 212b and 212c, collectively 212 but the system 200 can include a single remote server such as 212a. The remote servers 212 may perform the same functionality or may perform entirely different functionalities. For example, the remote server 212a may store all information associated with the vehicle, activities, instances of bad driving, etc., while the remote servers 212b and 212c analyze and process the captured data to detect bad driving. In further example, the remote server 212a may be configured to do image identification tasks, while the remote server 212b can be configured to identify bad driving. The remote database 213 may store various data and information such as activities related data, bad driving related data, vehicle associated data, driver associated data, authorities associated data, location associated data, roads & maps related data, pre-define rules, algorithms, and other data.

In some implementations, the communication module 206 may send the data captured using various sensors 202 to remote servers such as 212a, 212b, or 212c for further analysis and processing. The remote server 212 receives the data from the communication module 206, processes the received data and further detects if there is bad driving or signs of bad driving by other vehicles based on the pre-defined rules. The remote server 212 communicates about the bad driving to the communication module 206 which further communicates to the controller 204.

In some implementations, the data captured using the one or more sensors 202 can be sent to a remote server 212 via the communication module 206. The remote server 212 receives the data, analyzes, and processes the data using one or more algorithms as known or later developed to identify one or more signs of bad driving. Once the signs of bad driving is identified, the remote server 212 sends the data back to the communication module 206 which further communicates to the controller 204. The controller 204 further communicates to the heads-up display unit 208 of the vehicle 102a that communicates there is danger to other surrounding vehicles around the vehicle. The controller 204 further stores the activity that is a sign of bad driving in the storage module 210 or memory. In other examples, the communication module 206 can further send to other remote servers such as 212b, 212c for accessing in future and/or when the need arises. The remote server 212a can directly identify surrounding vehicles around the reporting vehicle and communicate to the other surrounding vehicles that there is bad driving behavior and sends a warning message/alert such as—"please stay safe". The remote server 212 can provide this information to interested parties based on demand. The remote server 212 can further send this information to nearest law& order enforcement party. The remote server 212 can further send it local, state, or national database server for records, later retrieval, access and/or use. The remote server 212 may also send it to any other database that is established and relevant to unsafe driving.

Figure 3:
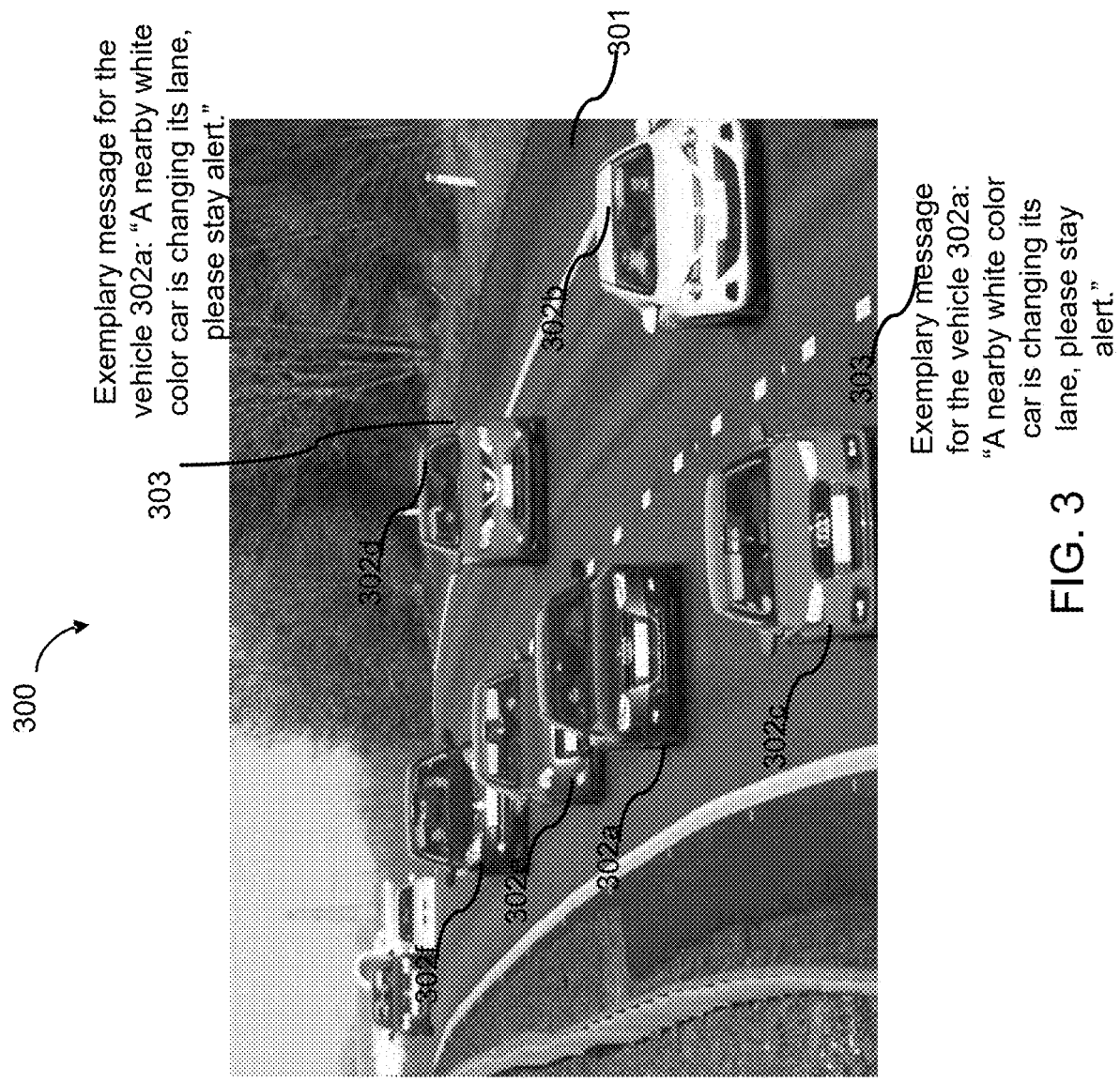
FIG. 3 shows a snapshot, where exemplary warning messages are sent to surrounding vehicles.

An exemplary scenario 300 is shown in FIG. 3, where multiple vehicles such as 302a, 302b, 302c, 302d, 302e, and 302f are running on a road 301. It is further considered that the bad driving detection and reporting system of the vehicle 302a detects bad driving by the vehicle 302b, where the vehicle 302b is showing a sign of bad driving, for example, by changing lane and moving towards the vehicle 302c without any indication. In such cases, exemplary warning message 303 is sent to the surrounding vehicles such as 302c and 302d. The exemplary alert message 303 can be: "A nearby white color car is changing its lane, please stay alert". The message 303 can be sent to the surrounding vehicles 302c and 302d via text, phone, via a user interface of the vehicle or can be displayed via heads-up display unit of the vehicles 302c and 302d. The vehicle 302a can communicate with the surrounding vehicles such as 302c and 302d through intra-vehicle communication.

Exemplary Bad Driving Servicing Database

Figure 4:
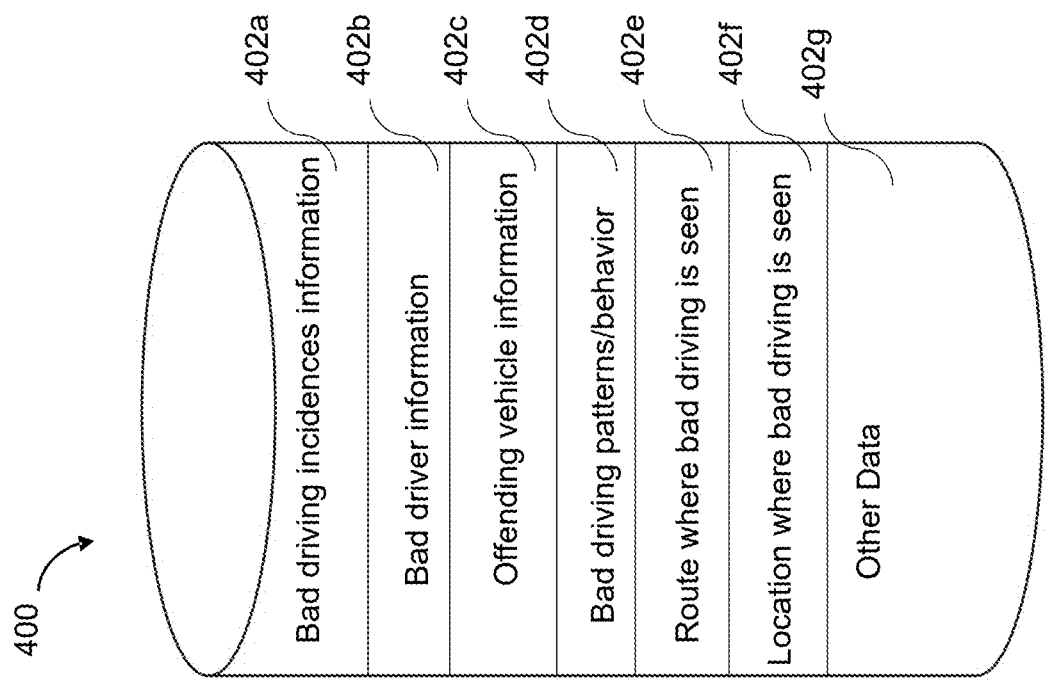
FIG. 4 shows a database including bad driving information.

FIG. 4 shows a database 400 for storing various information related to bad driving. For example, the database 400 includes information on bad driving incidences 402a, bad driver information 402b, offending vehicle information 402c, bad driving patterns/behavior 402d, route where bad driving is seen 402e, location where bad driving is seen 402f, and other data 402g.

The bad driving incidences 402a include incidents of bad driving from the captured live visual and non-visual data. The information 402a corresponds to specific instances of bad driving, for example, driving at the speed of 120 km/hr., or following too close. The bad driver information 402b includes information about bad drivers such as their images, names, age, driving license, nationality, phone number, driving style, driving pattern, driving route, destination and so on etc., The offending vehicle information 402c includes specific information about vehicles showing bad driving for example, images of the vehicle, vehicle characteristics including color, vehicle type, manufacturer of the vehicle, model, license plate, date of the vehicle, image of the vehicle or other characteristics that can help in identification of the offending vehicle or the like. The bad driving patterns information 402d includes various patterns/behaviors that can classify under bad driving, the patterns may be pre-stored, past patterns, patterns based on the present data. The route information 402e includes routes where bad driving is seen/noticed, recorded. The location information 402f includes the exact location where the bad driving or signs of bad driving is seen noticed/recorded. Additionally, the database 400 includes other data 402g such as live visual and non-visual about vehicles as captured, location related data, law enforcement authorities related data, roads & maps related data and other data. The law enforcement authorities related data includes images of the authorities, age, their vehicles information such as license plate, phone numbers, etc. The location related data includes various locations data of an area such as positions, coordinate information, important landmarks in the areas, images of the areas, etc. The roads & maps related data includes road information, map information such as routes, paths, etc. The other data includes additional data that is not captured above and can be relevant for implementing the disclosure. The examples discussed here are exemplary in nature and there can be more types of data that can be stored in the database 400. The database 400 can be called as bad driving information database or bad driving servicing database. Access to the database 400 can be provided to interested parties such as registered vehicles, law & enforcement authorities, traffic personnel based on one or more models such as on demand model, subscription-based model such as monthly, quarterly or the like.

Exemplary Method Flowchart

FIG. 5 is a method flowchart 500 for detecting bad driving in other vehicles and reporting about the same to others such as surrounding vehicles and/or law & enforcement authorities. The method 500 can be implemented by any vehicle incorporating a bad driving detection and reporting system. The bad driving detection and reporting is automatically activated when the vehicle is started. Specifically, the method 500 automatically activates various components of the bad driving detection and reporting system such as the sensors, controller, etc. as discussed above. The vehicle detecting bad driving in other vehicles can be termed as reporting vehicle and the other vehicles showing bad driving or signs of bad driving can be termed as offending vehicles. Further, the surrounding vehicles can be vehicles nearby to the reporting vehicle and/or to the offending vehicles. For easy discussion, it can be considered that the method 500 is implemented by a vehicle, for example, vehicle A, such that the vehicle A detects bad driving in other vehicles such as vehicle B and C and further reports surrounding vehicles D, E, F, G and any others in the vicinity. The vehicle A further communicates to law & enforcement authorities.

The method 500 beings when the vehicle A is started and upon starting the vehicle A, a plurality of capturing devices installed on/inside the vehicle A are automatically activated. Some examples of plurality of capturing devices include at least one or more high-resolution imaging devices, one or more infrared imaging devices, one or more LiDAR devices, one or more sonar devices, one or more radar devices, and one or more audio devices. The capturing devices may be installed on the vehicle A or may be installed inside the vehicle A or a combination thereof.

At 502, a vehicle is equipped with a plurality of capturing devices for capturing visual and non-visual data of other vehicles. The live visual and non-visual data associated with other vehicles such as vehicle B and vehicle C on roads is captured. The visual and/or non-visual data may relate to driving behaviors depicted by the one or more other vehicles or may also relate to activities performed by drivers of these other vehicles vehicle B and vehicle C. Few examples of the driving behaviors may include, but not limited to, lane change, aggressive driving, tailgating, reckless lane changes, excessive speeding, distracted driving, waving hand outside the vehicle, playing loud music, talking on a phone, eating while driving, impaired driving and so on. The data is captured by the vehicle A of other vehicles such as vehicle B and vehicle C while driving on road A. The captured visual and non-visual data may be stored locally inside the reporting vehicle and/or may be transmitted and stored over a remote location or server for later retrieval, analysis and/or use.

Upon capturing the data, the data is analyzed and processed further to detect signs of bad driving by the other vehicles such as vehicles B, and C based on one or more pre-defined rules & algorithms, at 504. In some implementations, sign of bad driving by the other vehicles such as vehicles B, and C is detected if the captured data includes one or more driving activities that are dangerous in nature, harmful to the society on the roads, and violating laws. For example, a driving activity by the other vehicles is classified as bad driving if the captured visual and non-visual data includes one or more activities that are at least one of: dangerous in nature, harmful to the society on the roads, and/or violating laws. The captured data is analyzed in real-time using artificial intelligence and machine learning algorithms techniques to detect bad driving behavior in other vehicles.

The rules & algorithms can be activity-based, time-based, frequency-based, type of activities, or a combination thereof. For example, if a lane change by a vehicle B is detected by the system of vehicle A for more than a given threshold, such as more than two times in a minute, it can be considered as a sign of bad driving by the vehicle B. In another example, if a lane change by a vehicle C is detected every 10 seconds, it can be considered as a sign of bad driving by the vehicle C or driver of the vehicle C. In further example, if speed of the vehicle B is greater than 90 km/hr is detected for more than 3 minutes, it can be considered as a sign of bad driving by the vehicle B. The activity/incidence detected as a sign of bad driving by the other vehicles vehicles B, and C is stored for later retrieval, access and/or use. In some implementations, any general activities or driving behaviour that are dangerous in nature, are harmful to the society on the roads, and violating the law are considered under bad driving or signs of bad driving. Upon detecting the sign of bad driving, location of the vehicles-vehicles B, and C when the sign of the bad driving is detected is identified, captured, and stored.

Few examples of the driving activities/behavior that can contribute to bad driving or can be considered as a sign of bad driving include but are not limited to: (i) speeding at excessive speeds well beyond the legal speed limits endangering both themselves and other road users, (ii) frequent lane changes without appropriate signalling leading to confusion and potential accidents among fellow drivers, (iii) aggressively cutting off other vehicles with little or no room for safe manoeuvring creating sudden and dangerous situations on the road, (iv) persistent tailgating, a practice that increases the risk of rear-end collisions and road rage incidents, (v) exhibiting road rage, which can escalate confrontations between drivers and compromise overall road safety, (vi) disregarding traffic stops and running red lights, putting pedestrians and other motorists at grave risk, (vii) illegally driving on the shoulder of roads, further contributing to traffic congestion and potential accidents, (viii) travelling against the designated direction on one-way streets, resulting in head-on collisions and chaos, (ix) driving on the wrong side of the street, violating traffic rules and creating imminent danger for oncoming traffic, (x) making offensive noises or signals, such as aggressive hand gestures or verbal insults, toward other drivers, escalating tensions on the road. Some of the activities, or a combination of these activities show dangerous driving behaviours' that not only endanger lives but also contribute to the overall deterioration of road safety and public well-being.

At 506, based on the detection, the signs of bad driving by the other vehicles—vehicles B, and C are communicated to at least: other one or more surrounding vehicles—vehicles D, E, F, G, on the road, and/or to nearest law & order enforcement authorities for a required action. The warning messages are sent when the sign of bad driving is detected. The communication about the signs of bad driving sent to the one or more surrounding vehicles is generated by machine learning and/or artificial intelligence processing.

Specifically, one or more warning messages about the bad driving by the other vehicles are sent to the surrounding vehicles, and/or to nearest law & order enforcement authorities for a required action, when the sign of bad driving is detected. The surrounding vehicles include any vehicles within a pre-defined boundary of the reporting vehicle and the vehicles showing signs of bad driving. For example, the surrounding vehicles can be vehicles ahead of the vehicles A, B and C, vehicles behind the vehicles A, B and C and other vehicles within a pre-defined boundary of the vehicles A, B and C, for example, 5 kms range of the vehicles B and C. The warning messages can be displayed on their dashboards. The warning messages can be in the form of text, emails, audio or via heads display unit. The driver of the surrounding vehicles can then take a required action, for example, they can stop for a while, or they can further slowdown to avoid any accidents.

Along with the other surrounding vehicles, law & order enforcement authorities are communicated for a required action. While communicating about bad driving to the law & enforcement authorities, additional information is sent to the law & order enforcement authorities including information about the vehicles B and C, the location of the vehicles B and C, the signs of bad driving by vehicles B and C, for further action. Few examples of the additional information may include general information about the other vehicles, the location of the other vehicles, and the signs of bad driving by the other vehicles and any other pertinent information as needed. To this end, the nearest law & order enforcement authorities is first identified. To identify the nearest law & enforcement authorities, the location of the offending vehicle is matched with locations of all law & enforcement authorities as stored. The remote server or the bad driving detection and reporting system continuously communicates with all law & order enforcement authorities for their respective locations. Upon matching, the nearest law & order enforcement authorities and their locations are identified. Specifically, the location of the law & order enforcement authorities is correlated with the location of the offending vehicle, this way the nearest law enforcement authorities are identified. Upon identification, the law & order enforcement authorities are communicated and informed about the bad driving behavior by the offending vehicle and/or by the driver of the offending vehicle.

In one implementation, the method 500 uses artificial intelligence and machine learning to analyze the captured data in real time.

The method 500 includes creating a database for storing information about the bad driving. Access to the database is provided based on one or more subscription models.

The disclosure provides methods and systems for bad driving detection in other vehicles and reporting the same to surrounding vehicles and to law & order enforcement authorities in real-time. The bad driving can include any dangerous driving habits, offensive driving, or the like.

The present disclosure provides methods and systems for detecting bad driving on roads and communicating about the bad driving to the surrounding. For example, the methods and systems send warning messages to the surrounding vehicles such that they can take timely action. In another example, the methods and systems send alerts to the law & order enforcement authorities so that they can take timely action, for example, following the vehicle showing sign of bad driving and telling them about their bad driving. In further example, the methods and systems send warning messages to the vehicle and/or driver of the vehicle showing sign of bad driving so that they are aware about their bad driving and consequences of the bad driving and immediately act on it.

The methods and systems focus on real-time monitoring, real-time analysis and estimation of bad driving and real-time warning or sending alert messages to vehicles, the surrounding vehicles, and the law & order enforcement authorities.

The methods and systems can incorporate the use of artificial intelligence and machine learning to estimate or to determine signs of bad driving in real-time. For example, artificial intelligence and machine learning techniques are configured for measuring the speed, time, date, acceleration, direction, speed variations, location, and mapping of the roadway relating to the offending vehicle. The method and systems further incorporate image recognition technologies such that it can identify the vehicle, license plate, various characteristics of the vehicle such as color, model, type of car, manufacturer of the car and so on. Machine language and Artificial Intelligence processing may also be utilized to formulate the messages that are being sent to vehicles along with law enforcement agencies.

Some examples of the signs of bad driving behavior includes but is not limited to over speeding, lane changing without indication, honking, cutting vehicles off, following too close, tailgating other vehicles, exhibiting road rage, running on traffic signs and signals, driving down one way and wrong lanes, and making offense noises or signals at other vehicles.

The methods and systems require a high level of complexity and are far more advanced than just an alert message.

The methods and systems focus on warning other people about bad driving. For example, if vehicle A is showing signs of bad driving, then other vehicles such vehicle B, C, D & E are informed/warned about the bad driving by vehicle A. In further example, information about the bad driving is informed to nearest law& order enforcement authorities.

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

The foregoing is illustrative only and is not intended to be in any way limiting. Reference is made to the accompanying drawings, which for a part hereof. In the drawings, similar symbols typically identify similar components, unless context dictates otherwise.

Note that the functional blocks, methods, devices, and systems described in the present disclosure may be integrated or divided into different combinations of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for detecting bad driving in other vehicles, the method comprising:
   equipping a first vehicle with a plurality of sensors for capturing visual data and non-visual data of other vehicles including a second vehicle;
   analyzing, using a controller in communication with the plurality of sensors, the captured visual and non-visual data to detect signs of bad driving by the second vehicle based on at least one pre-defined rule; and
   based on the detection, communicating, using the controller, about the signs of bad driving by the second vehicle to at least one entity selected from a set of entities consisting of: one or more surrounding vehicles including a third vehicle, and to law enforcement authorities, wherein the third vehicle is located within a predetermined range of the second vehicle, and wherein in response to communicating about the signs of bad driving by the second vehicle to the third vehicle, executing a corrective action by the third vehicle, wherein the corrective action includes at least one action selected from a set of actions consisting of: activating a horn, flashing lights, correcting and adjusting a direction of the third vehicle.

2. The method of claim 1, further comprising automatically activating, using the controller, the plurality of sensors when the first vehicle is started.

3. The method of claim 1, wherein the plurality of sensors is installed on the first vehicle, wherein the plurality of sensors includes at least one of high-resolution imaging devices, infrared devices, LiDAR devices, sonar devices, radar devices, and audio capturing devices.

4. The method of claim 1, further comprising storing, using the controller, the captured visual and non-visual data about the other vehicles in a memory for later retrieval, analysis, and use.

5. The method of claim 1, further comprising transmitting, using the controller, the captured visual and non-visual data about the other vehicles to one or more remote servers for later retrieval, analysis and use.

6. The method of claim 1, further comprising classifying, using the controller, a driving activity by the second vehicle as bad driving if the captured visual and non-visual data comprise at least one activity selected from a set of activities consisting of: one or more activities that are dangerous in nature, harmful to the society on the roads, or violating laws.

7. The method of claim 1, wherein the step of communicating further comprises providing, using the controller, a communication about the signs of bad driving sent to the at least one of the one or more surrounding vehicles, wherein the communication is generated by at least one artificial intelligence (AI) system.

8. The method of claim 1, wherein the step of communicating about the signs of bad driving to the law enforcement authorities further comprises sending, using the controller, additional information to the law enforcement authorities, wherein the additional information is selected from a set of additional information consisting of: general information about the other vehicles, locations of the other vehicles, and the signs of bad driving by the other vehicles.

9. The method of claim 8, further comprising correlating, using a remote server in communication with the controller, the locations of the other vehicles showing the signs of bad driving with one or more locations of law enforcement authorities.

10. The method of claim 9, further comprising identifying, using the remote server, the nearest law and order enforcement authorities based on the correlation.

11. The method of claim 1, further comprising accessing, using a remote server in communication with the controller, a database for storing information about the signs of bad driving.

12. The method of claim 11, further comprising providing, using the remote server, access to the database based on at least one subscription-based model.

13. The method of claim 1, wherein the step of analyzing further comprises analysing, using the controller, the captured visual and non-visual data in real-time and using an artificial intelligence (AI) system to detect the signs of bad driving by the other vehicles.

14. A system for detecting and reporting bad driving on roads, the system comprising:
   a reporting first vehicle comprising:
      a plurality of sensors configured to capture at least one type of data selected from a set of live data consisting of: live visual data and non-visual data about other vehicles including a second vehicle; and
      a controller in communication with the plurality of sensors, wherein the controller is configured to transmit the captured data to a remote server for analysis, processing and use; and
   one or more remote servers including the remote server, the one or more remote servers being communicatively coupled to the controller, wherein the remote server is configured to:
      receive the captured data and process the received captured data to detect signs of bad driving by the second vehicle based on at least one pre-defined rule; and
      communicate about the detected signs of bad driving by the second vehicle to at least one of a set of entities consisting of: one or more surrounding vehicles including a third vehicle, and to law enforcement authorities, wherein the third vehicle is located within a predetermined range of the second vehicle, and wherein, in response to communicating about the signs of bad driving by the second vehicle to the third vehicle, a corrective action is executed by the third vehicle, wherein the corrective action includes at least one action selected from a set of actions consisting of: activating a horn, flashing lights, correcting and adjusting a direction of the third vehicle.

15. The system of claim 14, wherein the controller is further configured to receive and process the captured data in real-time to detect signs of bad driving by the other vehicles using an artificial intelligence (AI) system.

16. The system of claim 14, wherein the controller is further configured to send the captured data about the other vehicles and the detected signs of bad driving by the other vehicles to the remote server for storage.

17. The system of claim 14, wherein the controller is further configured to communicate about the detected signs of bad driving by the other vehicles to at least one entity selected from the set of entities consisting of: at least one of the one or more surrounding vehicles on the roads within a predetermined proximity of the reporting first vehicle, and to law enforcement authorities.

18. The system of claim 14, wherein the remote server is further configured to provide information about the signs of bad driving by the other vehicles to interested parties.

19. The system of claim 14, wherein at least one of the one or more remote servers further comprises a server configured to store bad driving information and provide access to said information on-demand.

20. The system of claim 14, wherein the remote server is further configured to provide a communication about the signs of bad driving to at least one of the one or more surrounding vehicles, wherein the communication is generated by an artificial intelligence (AI) system.

* * * * *